United States Patent [19]
Chang

[11] Patent Number: 5,930,418
[45] Date of Patent: Jul. 27, 1999

[54] OPTICAL ASSEMBLY AND METHOD BASED ON TEC FIBRES

[75] Inventor: Kok Wai Chang, Sunnyvale, Calif.

[73] Assignee: Hewlett-Packard Company, Palo Alto, Calif.

[21] Appl. No.: 08/915,525

[22] Filed: Aug. 15, 1997

Related U.S. Application Data

[63] Continuation-in-part of application No. 08/805,001, Feb. 25, 1997.

[51] Int. Cl.$^6$ .................................................. G02B 6/27
[52] U.S. Cl. .......................... 385/24; 385/11; 385/35; 385/43; 385/47; 385/73
[58] Field of Search ................. 385/11, 14, 24, 385/31, 33, 35, 39, 43, 47, 52, 73, 74

[56] References Cited

U.S. PATENT DOCUMENTS

| | | | |
|---|---|---|---|
| 4,178,073 | 12/1979 | Uchida et al. | 350/151 |
| 4,737,004 | 4/1988 | Amitay et al. | 385/43 |
| 4,974,944 | 12/1990 | Chang | 350/377 |
| 5,151,955 | 9/1992 | Ohta et al. | 385/6 |
| 5,204,771 | 4/1993 | Koga | 359/281 |
| 5,237,445 | 8/1993 | Kuzuta | 359/281 |
| 5,262,892 | 11/1993 | Nakamura | 359/497 |
| 5,278,929 | 1/1994 | Tanisawa et al. | 385/93 |
| 5,315,431 | 5/1994 | Masuda et al. | 359/281 |
| 5,319,483 | 6/1994 | Krasinski et al. | 359/113 |
| 5,381,261 | 1/1995 | Hirai et al. | 359/282 |
| 5,428,477 | 6/1995 | Siroki | 359/484 |
| 5,446,578 | 8/1995 | Chang et al. | 359/282 |
| 5,471,340 | 11/1995 | Cheng et al. | 359/281 |
| 5,539,574 | 7/1996 | Robinson | 359/484 |
| 5,557,692 | 9/1996 | Pan et al. | 385/11 |
| 5,574,596 | 11/1996 | Cheng | 359/484 |
| 5,706,371 | 1/1998 | Pan | 385/11 |
| 5,734,763 | 3/1998 | Chang | 385/11 |
| 5,825,950 | 10/1998 | Cheng | 385/43 X |

FOREIGN PATENT DOCUMENTS

WO 97/22034   6/1997   WIPO .............................. G02B 6/27

OTHER PUBLICATIONS

Shinkosha, Isolator Revolution, ISO–SPI Data Sheet, 2 pages, no date.

*Primary Examiner*—John D. Lee

[57] ABSTRACT

An optical assembly, particularly for use as an optical circulator or optical isolator, includes utilizing an array of parallel thermally expanded core (TEC) fibers for transmitting light signals into and receiving light signals from an array of optical elements that is both polarization-dependent and non-reciprocal with respect to displacement of light propagating in opposite directions. In the preferred embodiment, the TEC fibers are precisely aligned using silicon V-groove techniques. Also in the preferred embodiment, focusing is used to improve the performance of the optical assembly. A microlens array reconverges the light energy of a polarization component that is propagating through the optical assembly separately from its associated polarization component. The array of microlenses may be formed into the glass substrate by diffusing ions through a photolithographic mask. Further in conformance with the preferred embodiment, each polarization component is converged by a particular microlens, is reflected by a mirror, and converged a second time by passage through the same microlens.

14 Claims, 11 Drawing Sheets

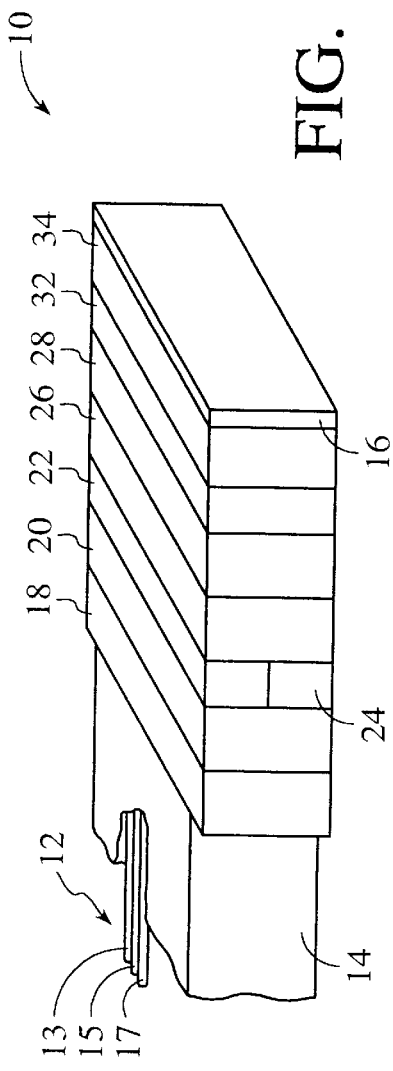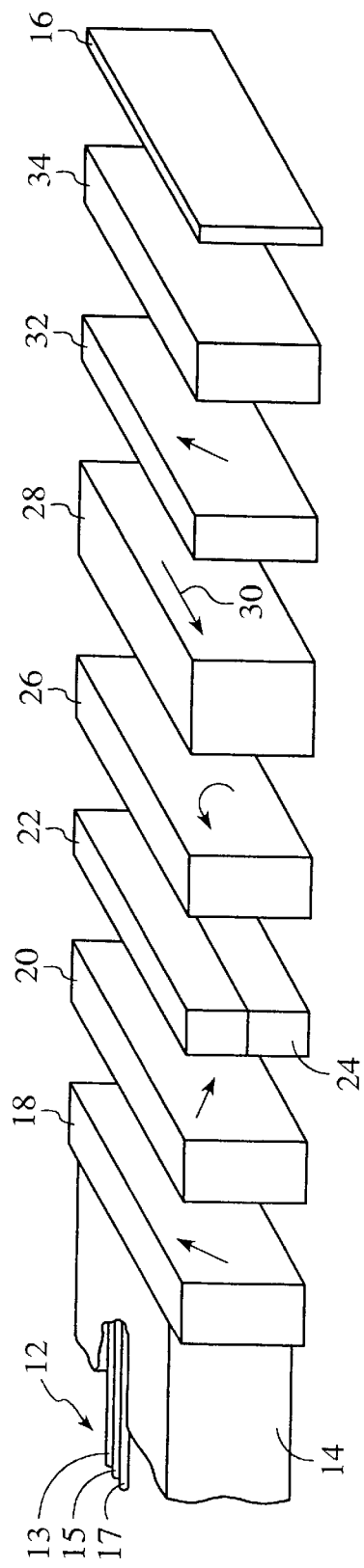

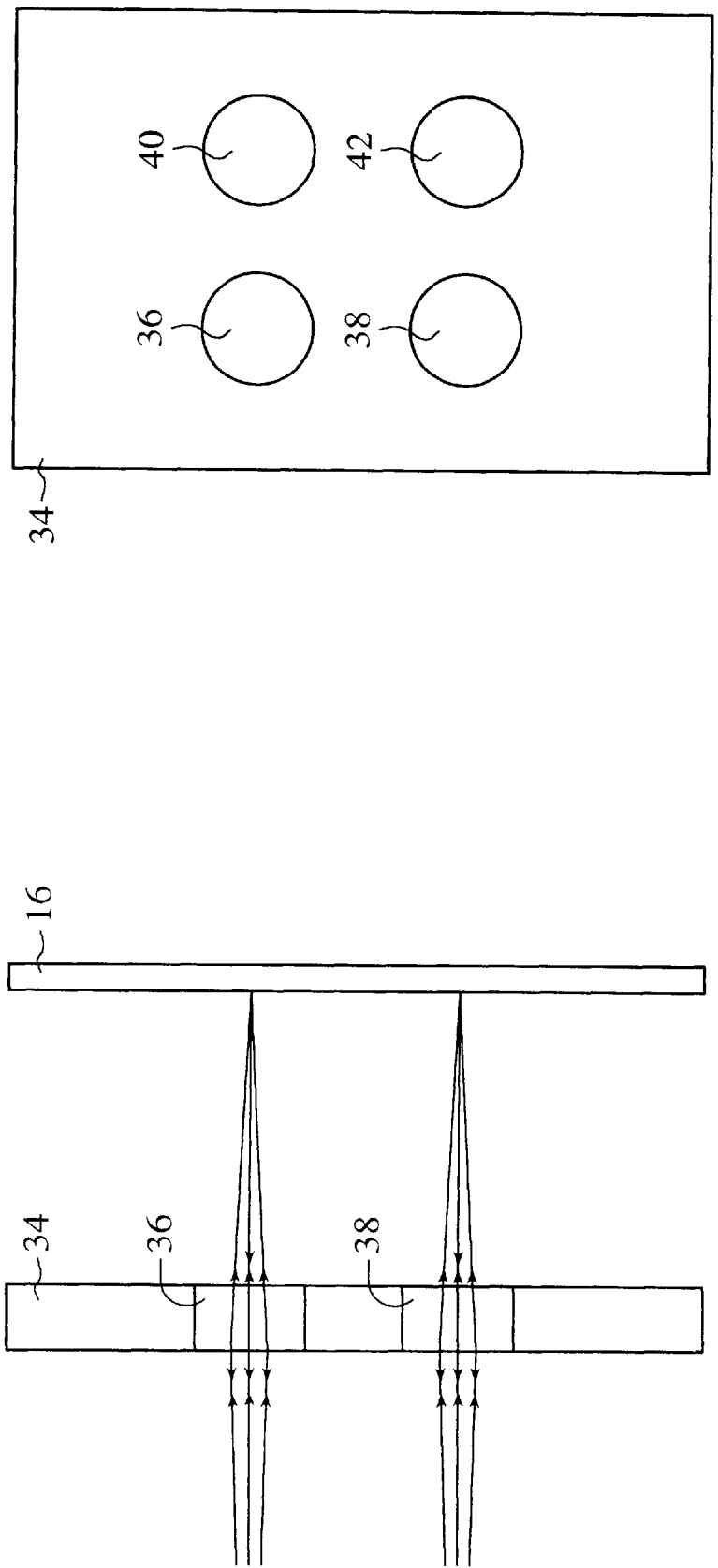

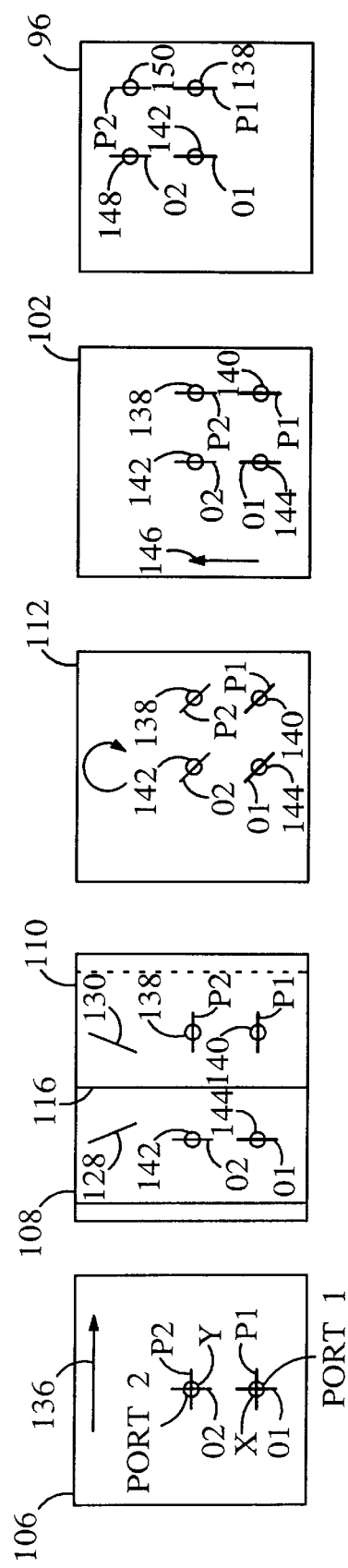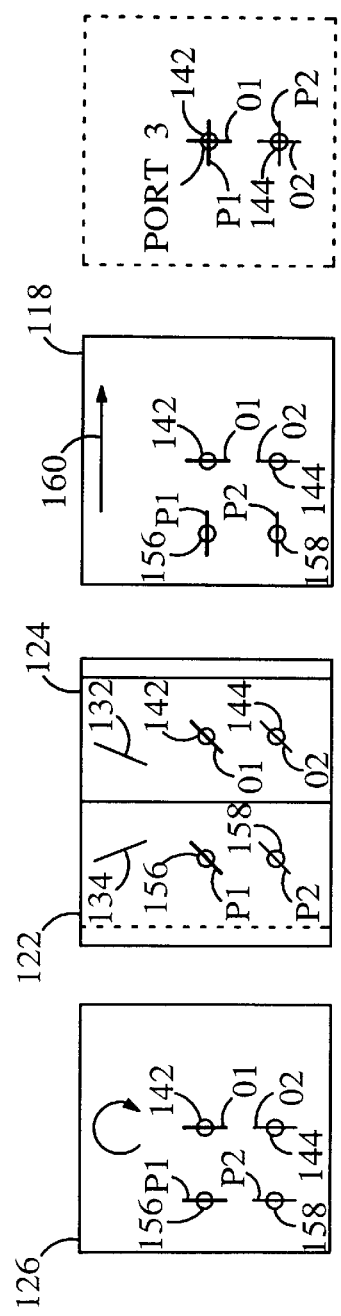
FIG. 19 FIG. 20 FIG. 21 FIG. 22 FIG. 23
FIG. 24 FIG. 25 FIG. 26 FIG. 27

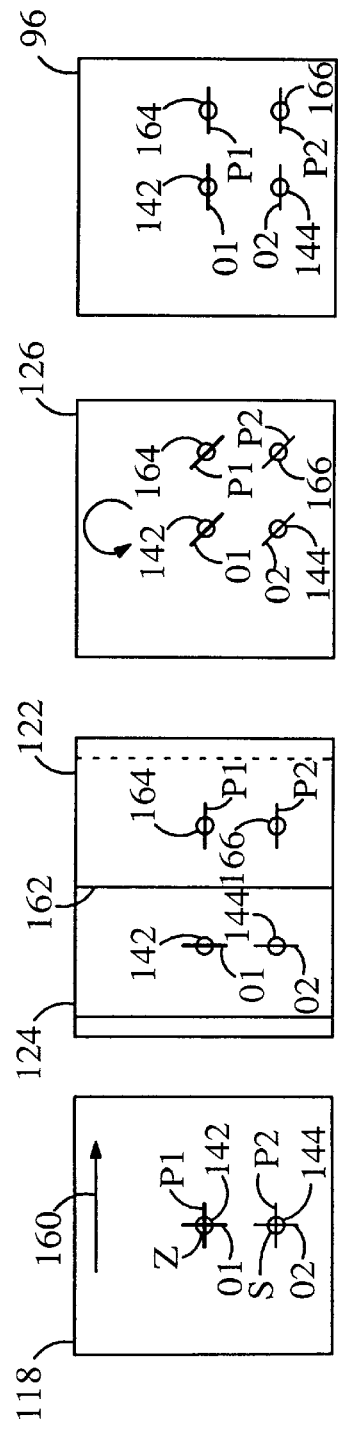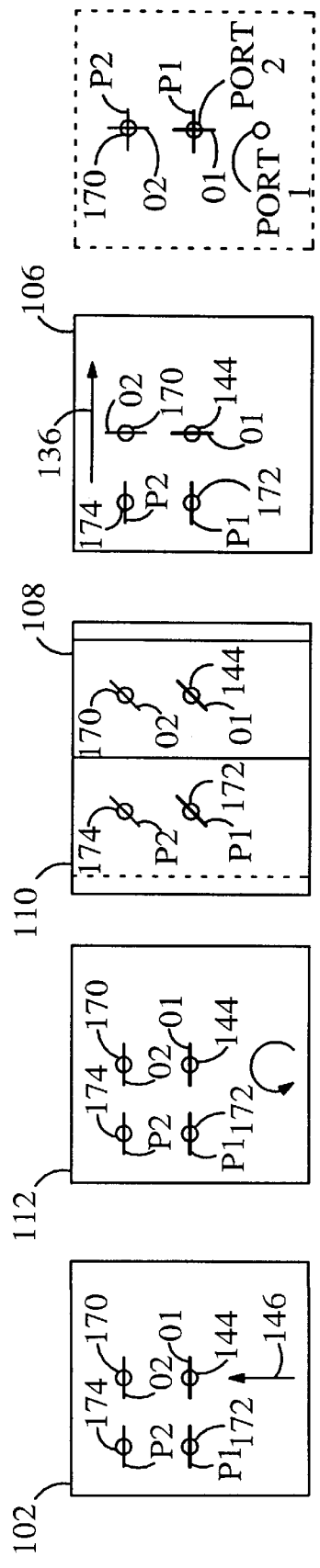

OPTICAL ASSEMBLY AND METHOD BASED ON TEC FIBRES

CROSS REFERENCE TO RELATED APPLICATION

The present application is a continuation-in-part application of U.S. Ser. No. 08/805,001, filed Feb. 25, 1997.

TECHNICAL FIELD

The invention relates generally to compact optical assemblies for coupling ports for signal transmission and more particularly to assemblies and methods for achieving optical isolation or circulation in multi-port systems.

BACKGROUND ART

The flexibility and reliability of communication networks based upon transmission of light signals via optical fibers are greatly increased by the availability of assemblies such as optical circulators and isolators. For example, a three-port circulator may be used to enable a single fiber to be used for bidirectional communications. By utilizing non-reciprocal optical elements, i.e. elements which affect light moving in different directions differently, a bidirectional fiber may be optically coupled to both an input fiber and an output fiber. The non-reciprocal operation provides differences in the "walk-off," i.e. spatial displacement, of oppositely directed light beams, so that the input and output fibers are optically isolated from each other.

An optical isolator may include only single-mode fibers. An input fiber directs light signals into an optical assembly that splits the signal into polarization components, performs non-reciprocal operations on the components, and recombines the components for output at an output fiber. The non-reciprocal operations are designed to reduce the likelihood that back-directed light will be aligned with the input fiber.

There are a number of factors that must be considered in the design of optical circulators and isolators. U.S. Pat. No. 5,319,483 to Krasinski et al. identifies insertion loss and crosstalk as two performance-related design considerations. Insertion loss is the difference in power between input light and the light that exits the optical assembly. The primary causes of insertion loss are identified as absorption of light and imperfections of polarization separation and recombination. Crosstalk in an optical circulator is the transmission of light from an input fiber to a fiber which is not the intended output fiber. Krasinski et al. assert that the primary cause of crosstalk in optical circulators is back-reflection from the various optical elements in the assembly. The system described in the patent utilizes birefringent crystals instead of polarization splitting cubes in an attempt to provide more complete polarization separation, thereby reducing insertion loss and crosstalk. Moreover, the system is one in which the optical elements of the assembly are in optical contact with each other, thereby reducing back-reflections. Similar techniques are utilized in the optical circulator described in U.S. Pat. No. 5,204,771 to Koga.

Another approach to reducing insertion loss and crosstalk is described in U.S. Pat. No. 5,574,596 to Cheng. The optical circulator includes two birefringent crystal end-plates, two non-reciprocal Faraday rotators inserted between the birefringent crystal end-plates, and a pair of matched birefringent crystal plates positioned between the two rotators. The first birefringent crystal end-plate divides an input beam traveling in a first direction into two polarization components. The adjacent non-reciprocal Faraday rotator properly aligns the polarization components for lateral displacement (walk-off) by the center birefringent crystal plates. The polarization components are again rotated at the second Faraday rotator. The second end-plate then recombines the two polarization components for output. Since the structure is operationally symmetrical from a center plane perpendicular to the direction of light propagation, the operations will be the same regardless of the direction of light input into the assembly. However, some of the operations are non-reciprocal, so that the opposed paths will not be coincident. In an attempt to reduce the number of required components for achieving optical isolation or circulation, Cheng et al. (in U.S. Pat. No. 5,471,340) utilize a mirror at an optical assembly having adjacent input/output ports at the end of the assembly opposite to the mirror. Thus, a birefringent crystal end-plate can perform both the polarization separation and the polarization recombination operations for a single input beam.

In addition to the above-identified performance-related concerns, there are manufacturing-related concerns. Preferably, the assembly is physically small, providing advantages with respect to the cost of materials and the ability to house a number of such assemblies. If there is an array of input/output ports at one side of an optical circulator or isolator, the core-to-core spacing between the ports (i.e. "pitch") may determine the width and the length of the assembly of optical elements. Conventionally, there is a pitch of at least 2 mm in order to accommodate the use of collimators. The minimum width of the assembly is the product of the pitch and the number of ports in the array. Rutile is a common material for forming the birefringent crystals that provide the desired walk-off displacements within the assembly. For each 1 mm of walk-off, the rutile crystal must have a thickness of approximately mately 10 mm. Thus, the conventional 2 mm pitch requires a crystal thickness of approximately 20 mm. Even if the pitch is reduced to 1.2 mm, the required thickness is only reduced to 12.5 mm. The thicknesses of the other optical elements in the assembly, e.g. the Faraday rotator, add to the total thickness dimension of the assembly.

The known assemblies require an input beam that is highly collimated in order to provide control over beam diversion and insertion loss. However, there are structural limitations provided by the prior art techniques. What is needed is an optical assembly and system for coupling ports for transmitting signals, such as light signals within a communication network, with a high density of input/output ports and with cost efficiency in the manufacturing process.

SUMMARY OF THE INVENTION

An optical assembly, particularly for use as an optical circulator or optical isolator, includes utilizing an array of parallel thermally expanded core (TEC) fibers for transmitting light signals into and receiving light signals from an array of optical elements that is both polarization-dependent and non-reciprocal with respect to displacement of light propagating in opposite directions. Each TEC fiber has an optical core with a generally constant diameter along a major portion, but with an expanded diameter at the end that is in light-transfer engagement with the array of optical elements. The structural characteristics of the optical cores of the TEC fibers reduce beam divergence upon launching a light signal from a fiber. Consequently, beam collimation is not required. This frees the assembly of any required lens element at the interface of the TEC fibers and the first polarization-dependent element of the assembly. The pitch of the fibers can therefore be significantly less than assemblies that require lenses at the fiber-to-element interface. In the preferred embodiment, the pitch is less than 300 μm.

While the structure of the TEC fibers reduces the beam divergence, focusing will improve the performance of most embodiments of the optical assembly. However, the focusing can be achieved using an internal optical element, rather than one which is at the fiber-to-element interface. In the preferred embodiment, the focusing occurs after a light signal has been divided into polarization components. The focusing operation does not affect the optimal pitch of the TEC fibers in the array. In contrast to an assembly in which lenses at the ends of the fibers influence the fiber pitch, the invention is one in which the positions of lenses or other focusing elements are influenced by the pitch of the TEC fibers.

In one embodiment, the focusing is achieved by using an array of microlenses. For example, microscopic lenses may be formed into a glass substrate by diffusing ions through a photolithographic mask. The integration of ion-exchange technology and photolithography to create a lens array is known in the art. In another embodiment, the focusing is achieved by forming concave surface features into a mirror that is positioned at the surface of the assembly opposite to the array of TEC fibers. In use with an optical circulator or isolator, the number of focusing features will be equal to 2n−2 (where n is the number of TEC fibers in the array), since a light signal from a TEC fiber is divided into two independently focused polarization components.

The method of transferring optical signals using the assembly includes directing a light beam forwardly from a first TEC fiber into the array of optical elements. In the preferred embodiment, the optical elements form a stack of contacting elements. The forwardly directed light beam is spatially separated into two polarization components. Each polarization component is displaced within the stack by a distance generally equal to the distance between the first TEC fiber and an adjacent second TEC fiber. In the preferred embodiment, the polarization components are individually focused and are individually reflected to propagate rearwardly through the stack toward the array of TEC fibers. The polarization components are recombined to be in alignment with the second TEC fiber. The step of displacing the polarization components is non-reciprocal, so that crosstalk among TEC fibers is controlled.

In the preferred embodiment, the TEC fibers are seated in an array of V-shaped grooves that are formed in a semiconductor substrate, such as a silicon wafer. The grooves are fabricated using integrated circuit fabrication techniques. Photolithographically forming the grooves ensures that the TEC fibers are precisely aligned relative to each other. Thus, when one TEC fiber is properly aligned with the array of optical elements, the remaining fibers are brought into registration. This simplifies the alignment process.

An advantage of the invention is that the optical assembly is physically small. The use of TEC fibers allows the pitch of the fibers to be significantly reduced relative to conventional optical circulators and optical isolators. The size of the assembly facilitates compact integration with similar assemblies and with other components of a larger system, such as a communications network. Moreover, the reduced pitch translates into a reduction in the materials cost. The greater density of fibers decreases the required width of the optical elements for a given number of fibers. Additionally, the walk-off of the polarization components is reduced, so that the required thickness of all walk-off optical elements is correspondingly decreased.

BRIEF DESCRIPTION OF THE DRAWINGS

FIG. 1 is a perspective view of a polarization-dependent optical assembly having a TEC fiber array in accordance with the invention.

FIG. 2 is an exploded perspective view of the optical assembly of FIG. 1.

FIG. 3 is a side sectional view of a focusing and reflecting arrangement for the assembly of FIGS. 1 and 2.

FIG. 4 is a forward end view of the focusing element of FIG. 3.

Figure 17:
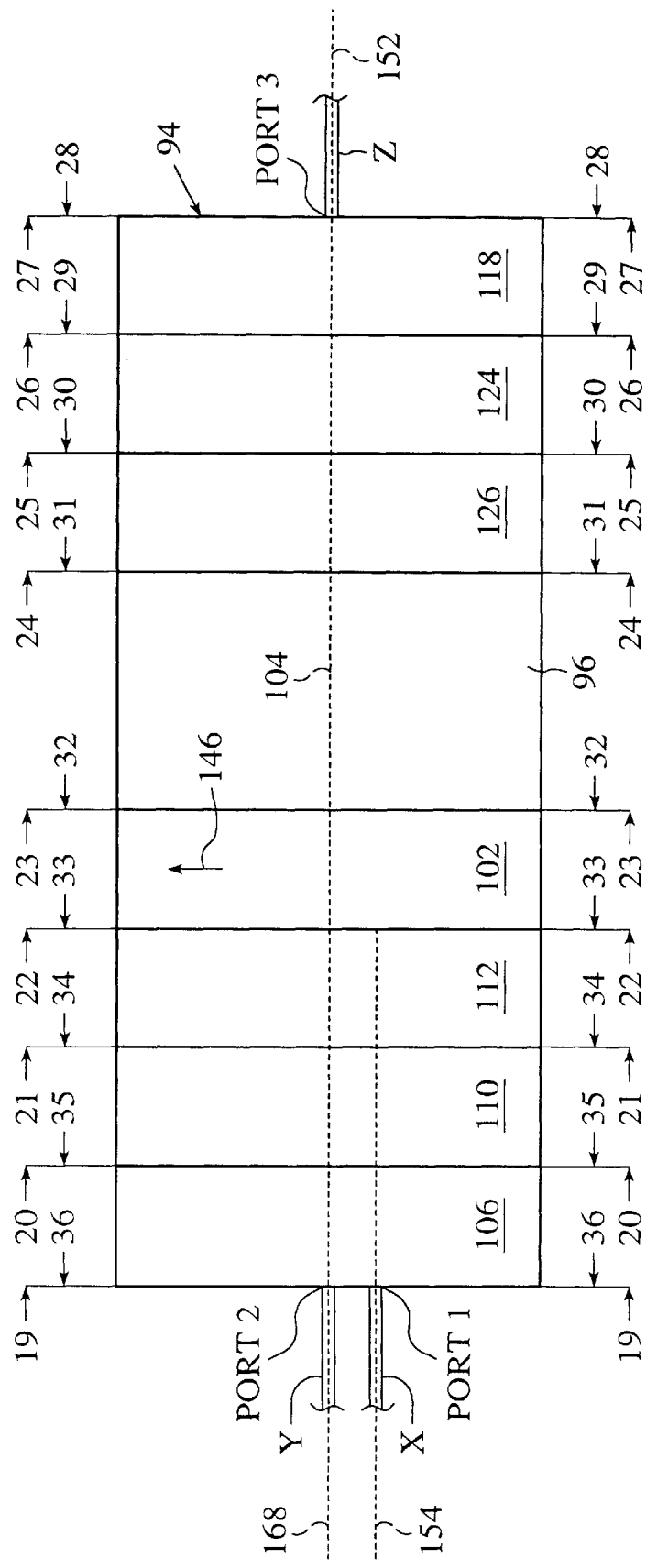
FIG. 17 is a side view of a second embodiment of an optical circulator in accordance with the invention.
Figure 18:
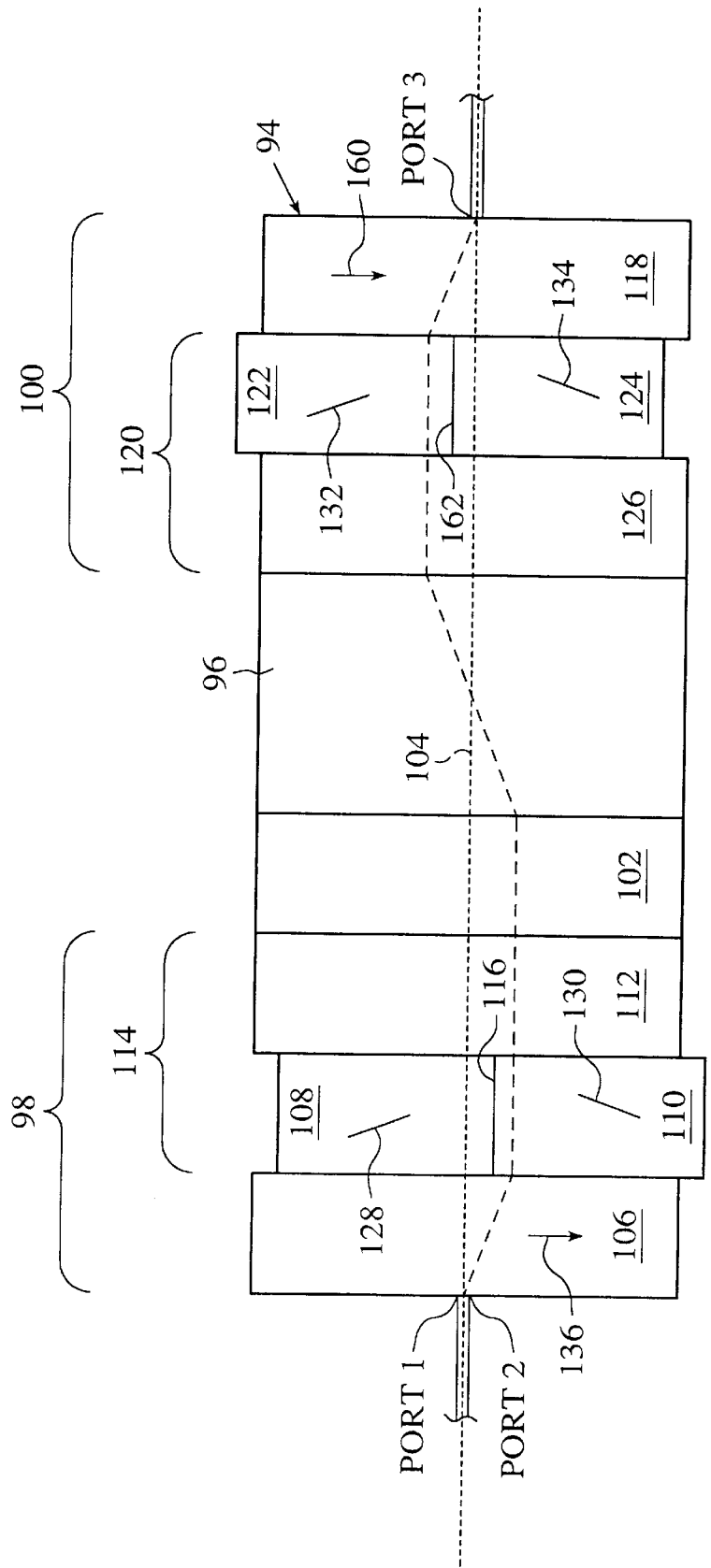
FIG. 18 is a top view of the optical circulator of FIG. 17.

19–27 illustrate the action of the optical circulator of FIGS. 17 and 18 upon light propagating through the optical circulator in the forward direction.

FIGS. 28–36 illustrate the action of the optical circulator of FIGS. 17 and 18 on light propagating through the optical circulator in the rearward direction.

Figure 37:
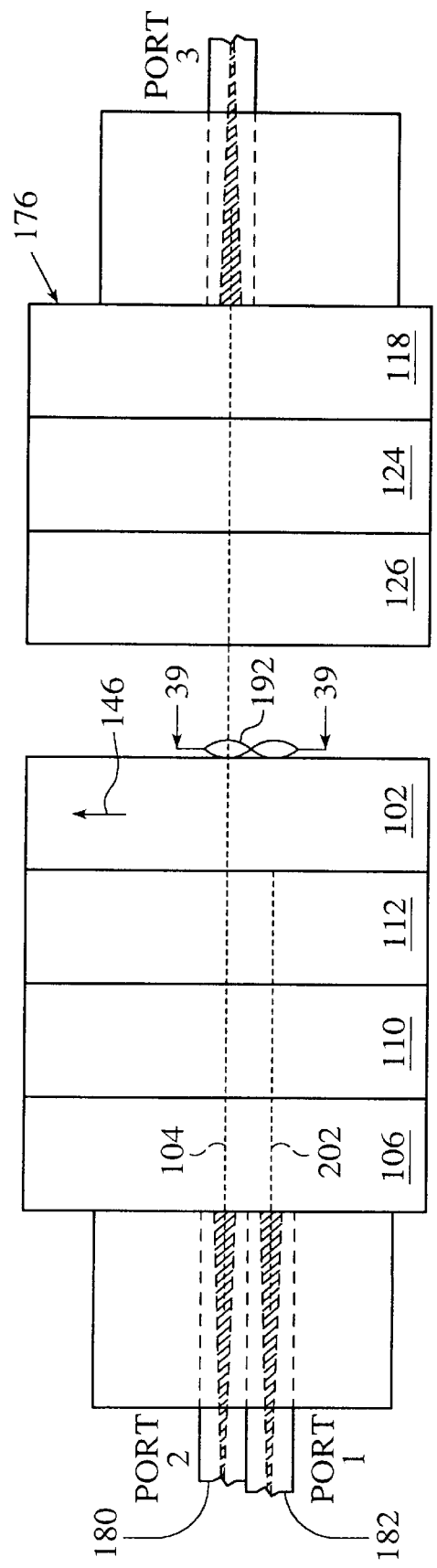

FIG. 37 is a side view of a third embodiment of an optical circulator in accordance with the invention.

Figure 38:
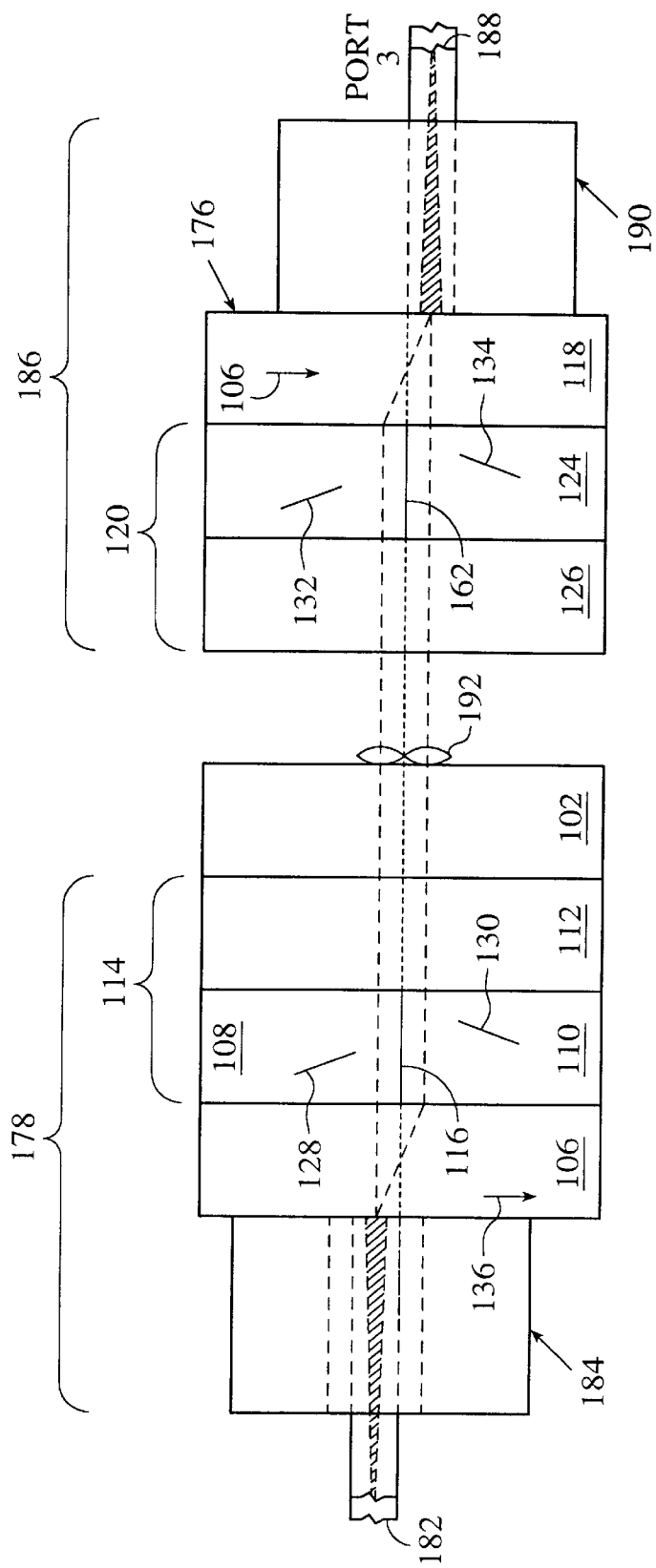

FIG. 38 is a top view of the optical circulator of FIG. 37.

Figure 39:
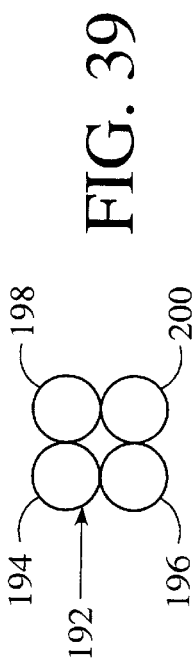

FIG. 39 is an end view of the microlens array used in the optical circulator of FIGS. 37 and 38.

DETAILED DESCRIPTION

With reference to FIGS. 1 and 2, an optical assembly 10 is shown as including an array 12 of TEC fibers 13, 15 and 17 coupled to an array of optical elements. The embodiment of FIGS. 1 and 2 will be described as a three-port optical circulator, but this is not critical. The width of the array of optical elements, as measured in a direction perpendicular to the length of the TEC fibers, accommodates a greater number of fibers, as will be described more fully below. Preferably, the width approaches a minimum width for accomplishing the signal transfers for which the optical assembly is designed.

The TEC fiber array 12 preferably has a pitch of less than 300 μm, but this is not critical. Presently, the minimum pitch is 125 μm, with an optimal pitch of 250 μm. The TEC fibers are preferably seated on a silicon wafer 14, which may be coated with a material to fix the fibers in position. The proper alignment may be achieved by forming V-shaped grooves in the silicon wafer. The structure of an individual TEC fiber will be described below with reference to FIG. 5. TEC fibers are commercially available from Sumitomo Osaka Cement Co., Ltd.

Propagation of light from one of the TEC fibers in the array 12 into the array of optical elements will be described as propagation in a forward direction. The propagation continues forwardly until a mirror 16 reflects the light.

Rearward propagation is defined as travel of light from the mirror toward the array 12 of TEC fibers.

In the forward direction, the first and second optical elements 18 and 20 form a walk-off crystal pair. The crystal pair operates to separate an input beam into orthogonal polarization components. With a walk-off direction of ±45°, a spatial separation of the polarization components is achieved. In the compact assembly 10 of FIGS. 1 and 2 in which the pitch of the TEC fiber array 12 is 125 μm, the thickness of the walk-off crystal pair may be only 0.885 mm in order to achieve the desired vertical separation. The material of the walk-off crystals 18 and 20 may be rutile (titanium dioxide-$TiO_2$) or yttrium vanadate ($YVO_4$). The preferred material is rutile, since it provides a greater refractive index. Consequently, rutile has a smaller in vacuo path length for a desired walk-off distance. A smaller path length results in less lateral spreading of the polarization components as they pass through the walk-off crystals.

The desired walk-off distance by the crystal pair 18 and 20 determines the thickness of the two elements. The walk-off crystals must vertically separate the polarization components such that one polarization component passes through an upper half-wave plate 22 and the other polarization component passes through a lower half-wave plate 24. The operations of the half-wave plates with a 45° Faraday rotator 26 place the polarization states of the polarization components in a parallel relationship. In one embodiment, the optical axis of the upper plate 22 is −45°, while the optical axis of the lower plate 24 is 0°. In another embodiment, the optical axis of the upper plate 22 is 0° and the optical axis of the lower plate is +45°. The Faraday rotator provides 45° counterclockwise rotation or 45° clockwise rotation.

The next element in the forward direction of light propagation is a walk-off crystal 28. Since the polarization states of the two polarization components are in a parallel relationship, the walk-off crystal 28 uniformly affects the vertically separated polarization components. As shown in FIG. 2, a walk-off direction 30 is perpendicular to the propagating light. The walk-off distance is preferably equal to the core-to-core pitch of the TEC fibers in the array 12. Thus, an input beam from a first TEC fiber 13 is laterally displaced for subsequent alignment with a second TEC fiber 15 that is adjacent to the first fiber. The preferred material for forming the walk-off crystal is rutile. To provide the desired lateral displacement, the crystal thickness, as measured parallel to the direction of light propagation, should be approximately ten times the pitch of the TEC fibers in the array 12.

The laterally displaced and vertically separated polarization components then enter another quarter-wave plate 32 having an optical axis of either +45° or −45°. The functions of the three optical elements 32, 34 and 16 at the rearward end of the assembly 10 are (1) to focus, (2) to reflect, and (3) to change the polarization states of the two polarization components so that the reflected light is not shifted a second time by the walk-off crystal 28. While FIGS. 1 and 2 illustrate an embodiment in which the three functions are achieved by three optical elements, this is not critical. The optical element 32 may be a quarter-wave plate and the mirror 16 may be fabricated to include an array of concave features that are aligned and dimensioned to independently focus the two polarization components of an input signal, thereby providing all three functions with only two optical elements. In another embodiment, the three functions are achieved using a quarter-wave mirror having the focusing elements.

In the preferred embodiment, the focusing is achieved using an array of microlenses formed in a glass substrate 34. A side view of the glass substrate and mirror 16 is shown in FIG. 3, while a forward-looking view of the glass substrate is shown in FIG. 4. Four microlenses 36, 38, 40 and 42 may be provided by diffusing ions through a photolithographic mask into the glass substrate. Thus, there is an integration of ion-exchange technology and photolithography. Such microlens arrays are commercially available from NSG America, Inc. Optionally, a swelled curvature may be created on the surface of each microlens 36–42 to increase the numerical aperture, if necessary. The microlens array improves the coupling efficiency for transferring input light signals from one TEC fiber 13, 15 and 17 in the array 12 to an adjacent TEC fiber.

In the embodiment of FIGS. 3 and 4, the ion implantation which forms the microlenses 36, 38, 40 and 42 is applied at the forward face of the glass substrate 34. Each microlens may then be fabricated to provide a focal length that is equal to the distance between the forward face and the surface of the mirror 16. In the forward direction, the beam diverges as it approaches a microlens. The beam energy is converged by the microlens and is reflected by the mirror. The rearwardly reflected beam is divergent, until the microlens refocuses the beam as it propagates rearwardly for output through the appropriate TEC fiber. In one embodiment, the lenses provide approximately four-to-one imaging for efficient optical coupling to the appropriate TEC fiber.

Referring to FIGS. 1–4, the microlenses 36 and 38 provide focusing for the two polarization components that are formed by separating a light signal input from a first TEC fiber 13 in the array 12. The vertical distance between the two microlenses 36 and 38 is determined by the walk-off in the vertical direction during the propagation of the input light beam through the walk-off crystal pair 18 and 20. On the other hand, the distance between horizontally adjacent microlenses, e.g. 36 and 40, is determined by the pitch of the TEC fibers in the array 12. In a practical application, the pitch of the fibers is 250 μm, so that the spacing between the optical axis of the microlens 36 and the optical axis of the microlens 40 is also 250 μm.

As noted, the microlenses 36 and 38 are utilized when an input signal is received from the first TEC fiber 13 in the array 12. The optical elements in the assembly 10 couple the input signal from the first fiber to an adjacent TEC fiber. In the three-port embodiment, the second TEC fiber is the center fiber 15. If the center fiber is used to input a light signal, the signal is divided into polarization components which are focused using the microlenses 40 and 42. The light signal from the center fiber is output via the third fiber 17 in the array. For such applications in which the optical elements provide coupling from fiber i to fiber i+1, the total number of microlenses in the array will be equal to 2n−2, where n is the number of TEC fibers in the array.

While FIG. 4 illustrates the microlenses 36–42 as being formed in the glass substrate 34, the microlenses may be formed in the mirror 16 of FIG. 3, as noted above. That is, FIG. 4 may be the forward surface of the mirror 16. The positions of the concave surface features in the mirror would be identical to the positions described with reference to the glass substrate 34. The contour of the surface features should be designed to image an input signal at the appropriate output TEC fiber. The mirror may be a glass substrate with a high reflectivity coating (e.g. gold) on the rearward face. The glass substrate could include the ion-formed microlenses which provide the required difference in refractive index for focusing each of the polarization components.

In some embodiments, a large-area lens may be substituted for the glass substrate 34 having the array of microlenses 36–42. However, this is not preferred. In other embodiments, the use of a focusing element is not required. However, commercially available TEC fibers require focusing in order to achieve optical coupling with an acceptable level of insertion loss. An acceptable level is between 1 dB and 2 dB. Presently, the commercially available TEC fibers have a mode-field diameter (MFD) of no greater than 45 µm. If TEC fibers having a larger MFD, such as 100 µm, become available, the fiber-to-fiber insertion loss will be reduced to an acceptable level without the use of an imaging lens.

Figure 6:
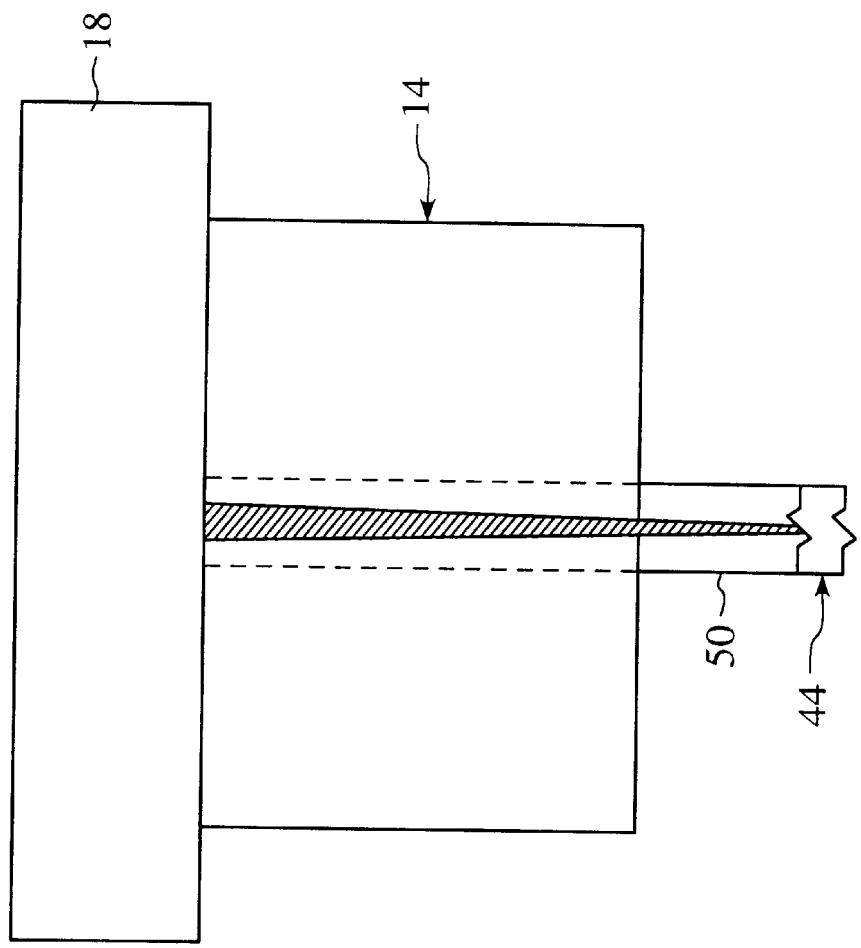
FIG. 6 is a side view of the TEC fiber of FIG. 5 abutting the first polarization-dependent optical element of FIG. 1.
Figure 5:
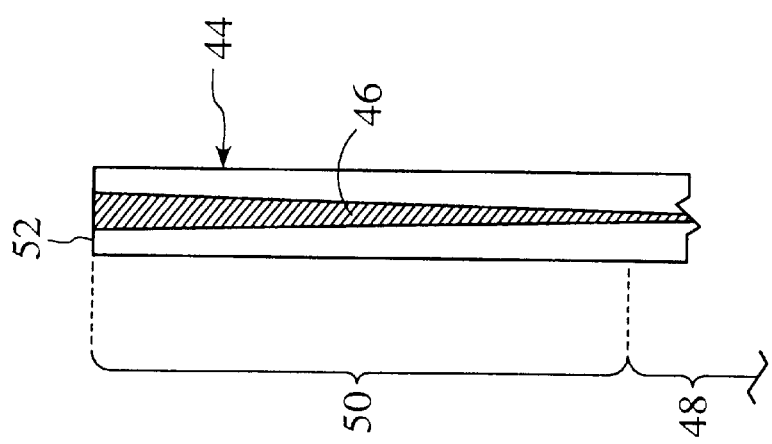
FIG. 5 is a side view of one of the TEC fibers in the array of FIGS. 1 and 2.

The structure of one of the TEC fibers is described more fully with reference to FIGS. 5 and 6. Each fiber is a thermally diffused, expanded-core (TEC) single-mode optical fiber. The TEC fiber 44 in FIGS. 5 and 6 has an optical core 46 with a constant diameter along a major portion 48 of the fiber. The major portion 48 is truncated in FIG. 5. At a first end 50 of the fiber, the diameter of the optical fiber progressively expands to reach a major diameter at a surface 52 that abuts the first walk-off crystal 18 of the array of optical elements. The expansion factor of the core is typically in the range of 2 to 5, and the expansion region typically has a length in the range of 4 to 6 mm.

Figure 15:
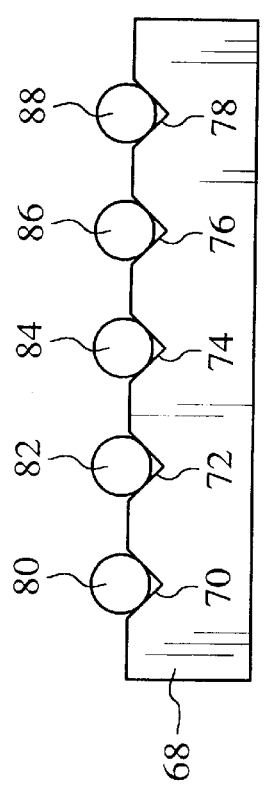
FIG. 15 is an end view of a silicon substrate having V-shaped grooves for precisely aligning five TEC fibers.
Figure 16:
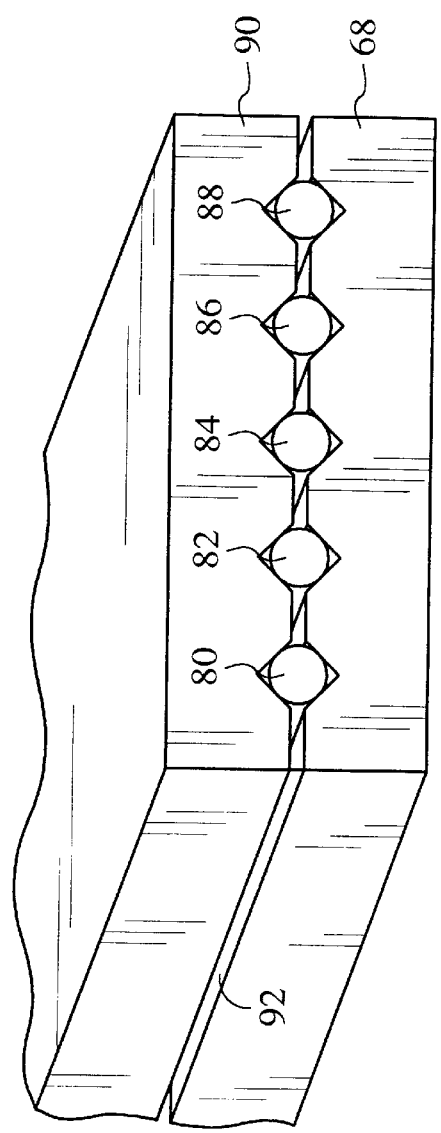
FIG. 16 is a partial perspective view of the silicon wafer of FIG. 15 having a second silicon substrate to sandwich the TEC fibers into position.

The expanded optical core 46 at the first end 50 of the fiber 44 reduces the angle at which light emitted from the surface 52 diverges laterally, as compared to conventional optical fibers. The reduction in the angle at which the light diverges is approximately equal to the expansion factor. The reduced lateral spreading of the light beam emitted from the TEC fiber 44 enables the spacing between the centers of adjacent TEC fibers to be substantially reduced. In one embodiment, the spacing is reduced to the distance corresponding to the outside diameter of the optical fibers. This places the outside surface of the optical fibers in contact with one another, as shown in FIG. 1. Minimizing the spacing between light beams provides a high density of input/output ports to the optical assembly of FIG. 1. This enables a reduction in the size and the cost of the assembly. However, in an alternate embodiment, the material coating the optical core is removed in order to facilitate seating of the fiber within a V-groove of a silicon wafer. Such an embodiment is shown in FIGS. 15 and 16. As can be seen, the fiber cores 80, 82, 84, 86 and 88 are spaced apart from each other.

Figure 7:
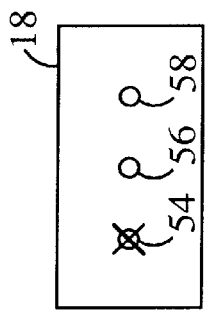

The operation of the assembly 10 of FIG. 1 is described with reference to FIGS. 7—14. In FIG. 7, a forward face of the first walk-off crystal 18 is shown as having three relevant locations 54, 56 and 58. The three locations correspond to the axes of the three TEC fibers 13, 15 and 17 in the array 12 of FIG. 1. In a three-port circulator embodiment, the location 56 corresponds to the fiber axis of a bidirectional TEC fiber that is optically coupled to the first TEC fiber 13 of location 54 to receive an input signal and is coupled to the third TEC fiber 17 at location 58 to transmit a light signal to the third TEC fiber. The fibers are optically isolated with respect to all other light propagation. However, other embodiments are anticipated.

Figure 8:
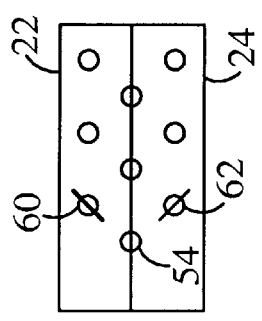

In FIG. 7, an input signal from the first TEC fiber is represented by two polarization components that intersect at location 54. For clarity, one of the polarization components is shown as being thicker than the other polarization component. The first operation of the optical elements is to spatially separate the two polarization components. This operation is performed by the pair of walk-off crystals 18 and 20. Consequently, at the forward faces of the upper and lower half-wave plates 22 and 24, the two polarization components are vertically separated. This is represented in FIG. 8 at locations 60 and 62. The two polarization components at locations 60 and 62 are still in orthogonal relationship, but have been vertically separated to align one polarization component for propagation through the upper half-wave plate 22 and align the other polarization component for propagation through the lower half-wave plate 24.

Figure 9:
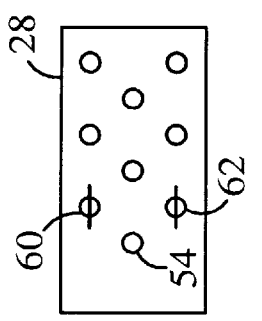

A second operation of the optical assembly 10 is to align the polarization states of the two polarization components into an orientation for lateral displacement of the components by the walk-off crystal 28. The realigned polarization components at the forward face of the walk-off crystal 28 are shown in FIG. 9. The combination of the two half-wave plates 22 and 24 and the 45° Faraday rotator 26 provides a clockwise rotation of 45° for the upper polarization component and a counterclockwise rotation of 45° for the lower polarization component. Therefore, the polarizations are the parallel states at the forward face of the walk-off crystal 28, as shown in FIG. 9.

Figure 10:
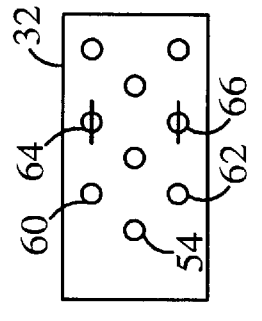
FIGS. 7–14 illustrate the operations performed upon polarization components during forward and rearward propagation through the assembly of FIG. 1.

As the next step, the polarization components are displaced in a horizontal walk-off direction by a walk-off separation equal to the pitch of TEC fiber array 12. In FIG. 10, the polarization components have been shifted from locations 60 and 62 to locations 64 and 66.

Figure 13:
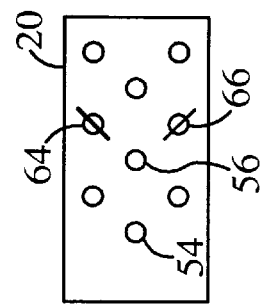
Figure 12:
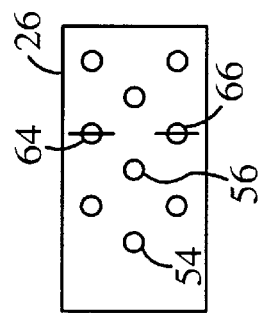
Figure 11:
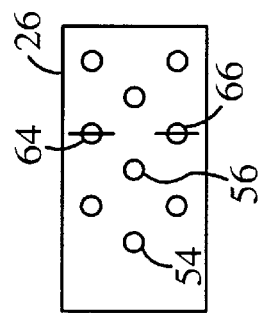

The walk-off crystal 28 that provides the horizontal displacement equal to the pitch of the TEC fiber array is non-reciprocal. In order to ensure that the walk-off crystal does not provide a second major displacement during propagation of the polarization components in the rearward direction following reflection by the mirror 16, the polarization states of the polarization components are changed from horizontal to vertical. The optical elements 32, 34 and 16 cooperate to provide a quarter-wave mirror lens assembly. The result is shown at the rearward face of the walk-off crystal 28 in FIG. 9. Comparing the forwardly propagating polarization components at the forward face of the crystal 28 in FIG. 11 with the rearwardly propagating polarization components at the rearward face of the crystal 28 in FIG. 11, the components have been displaced laterally and have rotated polarization states. Because the polarization states have been rotated by 90°, the non-reciprocal walk-off crystal 28 does not affect propagation of the polarization components through the crystal. Consequently, the polarization components reach the rearward face of the Faraday rotator 26 in the states and positions shown in FIG. 12. The Faraday rotator 26 and the two half-wave plates 22 and 24 return the two states of the polarization components into the original orthogonal relationship. As shown in FIG. 13, the polarization component at location 64 passes through the Faraday rotator and the upper half-wave plate and is consequently rotated 45° clockwise. On the other hand, the propagation of the lower polarization component through the Faraday rotator and the lower half-wave plate causes 45° counterclockwise rotation of the polarization state.

Figure 14:
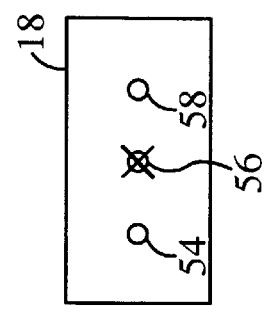

Finally, the 45° walk-off crystal pair formed by optical elements 18 and 20 recombine the two polarization components. As shown in FIG. 14, the output light signal is aligned with the location 56 of the center TEC fiber when the polarization components reach the forward face of the first walk-off crystal 18. Comparing FIGS. 7 and 14, the input of the light signal at location 54 by the first TEC fiber is coupled to the center TEC fiber in FIG. 14 at location 56. An identical operation occurs at the center TEC fiber as an input fiber for the third TEC fiber at location 58. The polarization components will follow the same operations for input signals from the center TEC fiber, but will be at positions to the right of the polarization components illustrated in FIGS. 7–14. However, the optical properties of the elements to not allow reverse coupling. That is, the assembly provides a selective optical coupling and a selective optical isolation of the three fibers.

A preferred method for properly aligning the TEC fibers is described with reference to FIGS. 15 and 16. A semiconductor substrate, such as a silicon wafer 68, is etched to form V-shaped grooves 70, 72, 74, 76 and 78. Conventional integrated circuit fabrication techniques may be utilized. For example, the grooves may be formed photolithographically, using a mask to define the grooves and using a chemical etchant. While not critical, the angle of one wall of a groove relative to the other wall is preferably 70.5°. TEC fiber cores 80, 82, 84, 86 and 88 without coating material are then placed within the grooves. The silicon processing enables a precise center-to-center spacing of the fiber cores. Tolerances of less than 1 micron are achieved.

In FIG. 16, a second silicon wafer 90 having a corresponding array of V-shaped grooves is fixed to the lower silicon wafer 68 by a layer of adhesive 92. The use of an adhesive layer is not critical. Alternatively, wafer bonding may be used to attach the two silicon wafers. Silicon V-groove alignment of single-mode fibers and multi-mode fibers is known in the art, and assemblies of the type shown in FIG. 16 are commercially available.

An advantage of silicon micromachining to provide submicron tolerances for TEC fiber alignment is that all of the fibers are brought into registration with optical elements by properly aligning one of the fibers. For example, in FIGS. 1–4, the three TEC fibers in the array 12 will have a known fiber-to-fiber pitch that can be reliably used to determine the walk-off distances for optical elements 18, 20 and 28 and the pitch of the microlenses 36, 38, 40 and 42. Optionally, a number of the optical assemblies 10 of FIG. 1 may be fabricated in bulk and dissected to form multiple assemblies only after the two TEC fibers at the opposite ends of the array are properly aligned to the optical elements. By ensuring that the two fibers at the opposite ends are properly positioned, the interior fibers are simultaneously aligned with the associated optical elements, such as the microlenses.

FIGS. 17 and 18 show a side view and a plan view of a second embodiment of a compact optical assembly 94 that utilizes an interior lens element 96. The assembly of FIGS. 17 and 18 is a three-port optical circulator that does not include the mirror element of FIG. 1. Instead, two complementary input/output (I/O) assemblies 98 and 100 are at opposite ends of the three-port optical circulator. Between the two I/O assemblies are a perpendicular walk-off crystal 102 and the lens element 96. The perpendicular walk-off crystal laterally displaces light propagating through the circulator in the forward direction, but does not laterally displace light propagating in the reverse direction. In FIGS. 17 and 18, the forward direction is defined as the propagation from the first I/O assembly 98 to the second I/O assembly 100.

The optical axis of the lens element 96 defines the optical axis 104 of the circulator 94. PORT 2 is a TEC fiber through which the optical circulator receives a light beam Y. PORT 3 is a TEC fiber through which the optical circulator receives a light beam Z. The light beams Y and Z are located on the optical axis 104. PORT 1, through which the optical circulator receives a light beam X, is displaced laterally from the optical axis. For example, the lateral displacement from the optical axis may be less than approximately 200 μm.

In the forward direction, the optical circulator 94 receives the two input light beams X and Y via PORT 1 and PORT 2, respectively. The light beam X is transmitted to PORT 3, while the light beam Y is transmitted to a location laterally displaced from PORT 3. In the reverse direction, the optical circulator receives the input light beam Z via PORT 3 and transmits the light beam to PORT 2.

The first I/O assembly 98 includes a walk-off crystal 106, split half-wave plates 108 and 110, and a Faraday rotator 112. The split half-wave plates 108 and 110 and the Faraday rotator 112 operate as a split polarization rotator 114 arranged along the optical axis in the forward direction of beam propagation. The half-wave plate 108 is referred to herein as the positive half-wave plate, while the adjacent plate 110 will be referred to as the negative half-wave plate. The two plates are joined at a line of attachment 116.

The second I/O assembly 100 is the complement of the first I/O assembly 98. A walk-off crystal 118 receives an input signal from the TEC fiber of PORT 3. A split polarization rotator 120 is comprised of a positive half-wave plate 122, a negative half-wave plate 124, and a Faraday rotator 126.

The operations of the split polarization rotators are dependent upon the direction of beam propagation. For the first split polarization rotator 114, the rotational direction is either 0° or 90°, depending upon whether the light is passing through the positive half-wave plate 108 or the negative half-wave plate 110 and depending upon whether the light is propagating in the forward direction or the rearward direction. The Faraday rotator 112 is selected to rotate the direction of polarization of light passing through the optical circulator 94 in the forward direction clockwise by 45°. The Faraday rotator is a non-reciprocal device, so it rotates the direction of polarization of light passing through the first split polarization rotator 114 in the rearward direction counterclockwise by 45°.

The half-wave plates 108 and 110 of the first split polarization rotator 114 are reciprocal devices. The positive half-wave plate 108 has an optical axis, indicated by line 128, aligned at +22.5° relative to the line of attachment 116. The negative half-wave plate 110 has an optical axis, indicated by line 130, aligned at −22.5° relative to the line of attachment. In the forward direction, the positive half-wave plate effectively rotates a polarization component that is parallel or perpendicular to the line of attachment 116 by 45° counterclockwise about the direction of travel of the light. This can be seen by comparing FIGS. 20 (left-hand half) and 21. FIGS. 19–27 will be described more fully below. The negative half-wave plate 110 effectively rotates a polarization component that is parallel or perpendicular to the line of attachment 116 by 45° clockwise about the direction of travel of the light. This can be seen by comparing FIGS. 20 (right-hand half) and 21. The operation of the second split polarization rotator 120 is similar to that of the first polarization rotator and will not be described separately. The positive half-wave plate 122 has an optical axis 132 that is offset by +22.5°, while the negative half-wave plate 124 has an optical axis 134 that is offset by −22.5°.

FIGS. 19–27 illustrate polarization components of light beams X and Y at various locations during forward propagation through the optical circulator of FIG. 17. In FIG. 19, the light beams X and Y are shown at the forward face of the walk-off crystal 106. The light beam X is shown as having an orthogonal polarization component O1 indicated by a long thick bar, and a parallel polarization component P1, indicated by a short thick bar. The light beam Y is shown as having an orthogonal polarization component O2, indicated by a long thin bar, and a parallel polarization component P2, indicated by a short thin bar. The orthogonal polarization components O1 and O2 are the polarization components of the light beams X and Y that are perpendicular to the walk-off direction 136 of the walk-off crystal 106 of the first I/O assembly 98. The parallel polarization components P1 and P2 are the polarization components of the light beams X and Y that are parallel to the walk-off direction 136.

In the first split polarization rotator 114, of FIG. 18 the parallel polarization components P2 and P1 are respectively located at the displaced locations 138 and 140, as shown in FIG. 20. The displacement is relative to the optical axis 104 of FIGS. 17 and 18. The locations 138 and 140 are also displaced relative to locations 142 and 144 of the orthogonal polarization components O2 and O1 by the walk-off distance of the walk-off crystal 106. As previously noted, the walk-off crystals may be made of rutile. The walk-off distance will be dependent upon the thickness of the crystal.

Referring to FIG. 18, the line of attachment 116 of the positive and negative half-wave plates 108 and 110 is displaced laterally from the optical axis 104 in the walk-off direction 136 of the walk-off crystal 106 by approximately one-half of the walk-off distance. Consequently, as shown in FIG. 20, the orthogonal polarization components O1 and O2 enter the positive half-wave plate 108 and the parallel polarization components P1 and P2 enter the negative half-wave plate 110, with the locations 138, 140, 142 and 144 being symmetrically arranged relative to the line of attachment 116.

In the forward propagation, the direction of polarization of the orthogonal polarization components O1 and O2 is unchanged by the propagation through the split polarization rotator 114. This can be seen by comparing FIGS. 20 and 22. On the other hand, the direction of polarization of the parallel polarization components P1 and P2 is rotated through 900 by the combination of the effects of the negative half-wave plate 110 and the Faraday rotator 112. FIG. 22 illustrates the polarization components as they enter the perpendicular walk-off crystal 102 from the split polarization rotator 114.

The first split polarization rotator 114 rotates the direction of polarization of only the parallel polarization components P1 and P2 in order to set the direction of polarization of all four polarization components parallel to the walk-off direction 146 of the perpendicular walk-off crystal 102. The perpendicular walk-off crystal displaces each of the polarization components in the walk-off direction by the walk-off distance determined by the thickness of the crystal. The walk-off distance should be equal to the spacing between the light beams X and Y in FIG. 19. Consequently, the perpendicular walk-off crystal laterally displaces the orthogonal polarization component O1 of the light beam X to a position corresponding to the optical axis 104 of the light beam Y. This corresponds to the displaced location 142 previously occupied by the component O2. The perpendicular walk-off crystal also laterally displaces the parallel component P1 of the light beam X to the displaced location 138 previously occupied by the parallel component P2. The polarization components O2 and P2 are likewise shifted in the walk-off direction 146 by the walk-off distance. As shown in FIG. 23, polarization component O2 is shifted to displaced location 148 and the polarization component P2 is shifted to the displaced location 150.

The lens element 96 may be a single gradient-index (GRIN) lens or may be a lens array of the type described with reference to FIG. 3. The lens or lenses reconverge the individual polarization components, which diverge as they pass through the optical circulator 94. The focal length of each lens and its spacing from the forward face of the second I/O assembly 100 forms an image on the adjacent element.

In the forward direction, the adjacent element is the Faraday rotator 126, while in the rearward direction of propagation, the adjacent element is the perpendicular walk-off crystal 102.

The lens 96 inverts the positions of the polarization components O1, P1, O2 and P2 about the optical axis 104. Since the orthogonal polarization component O1 lies on the optical axis, the lens leaves the position of this polarization component unchanged. The axis 152 of PORT 3 coincides with the optical axis, so the lens leaves the orthogonal polarization component O1 aligned with PORT 3. The lens inverts the position of the orthogonal polarization component O2 about the optical axis to the position 144 corresponding to the axis 154 of the light beam X, and inverts the positions of the parallel polarization components P1 and P2 about the optical axis to displaced locations 156 and 158, as shown in FIG. 24.

FIG. 24 shows the polarization components as they enter the second I/O assembly in the forward direction. The Faraday rotator 126 causes clockwise rotation of the polarization components. The rotation is continued by the positive half-wave plate 122 in FIG. 25, but the negative half-wave plate 124 returns the orthogonal components O1 and O2 to the direction shown in FIG. 24. The polarization components passing through the optical circulator 94 in the forward direction propagate through the second split polarization rotator 120 of FIGS. 18 24 and 25 in the opposite arrangement of the propagation through the first split polarization rotator 114. Consequently, the direction of polarization of the orthogonal components O1 and O2 is unchanged by the propagation through the Faraday rotator 126 and the negative half-wave plate 124. On the other hand, the direction of polarization of the parallel components P1 and P2 is rotated through 90° by passage through the Faraday rotator 126 and the positive half-wave plate 122.

FIG. 26 shows the polarization components as they enter the walk-off crystal 118 from the second split polarization rotator 120. The parallel polarization components P1 and P2 are parallel to the walk-off direction 160 of the walk-off crystal 118. The walk-off distance is selected to be equal to the distance between locations 142 and 156. Consequently, the parallel polarization components P1 and P2 are shifted into alignment with the corresponding orthogonal polarization components O1 and O2. The parallel polarization component P1 of the light beam X is overlaid on the orthogonal polarization component O1 of the light beam X at the location of the axis of PORT 3, and the parallel polarization component P2 of the light beam Y is overlaid on the orthogonal polarization component O2 of the light beam Y at the location 144 of the axis 154, laterally displaced from PORT 3. Thus, only the light beam X entering the optical circulator 94 via PORT 1 is transmitted to PORT 3. The light beam Y entering the optical circulator via PORT 2 is transmitted to a point laterally displaced from the PORT 3, and so does not enter PORT 3. This is shown in FIG. 27.

The operation of the optical circulator 94 of FIG. 17 upon light propagating in the reverse direction will be described with reference to FIGS. 28–36. These figures show the polarization component of the light beam Z and a spurious light beam S at various points in the optical circulator, as indicated by section lines 28—28 through 36—36 in FIG. 17. As noted above, the light beam Z is an input beam from PORT 3, which is a TEC fiber. The spurious light beam S is the same beam that is illustrated in FIG. 27 as being misaligned with PORT 3 in order to optically isolate PORT 2 from PORT 3 with respect to light propagating in the forward direction.

FIG. 28 shows the light beams Z and S as the beams enter the second I/O assembly 100. The light beam Z enters the second I/O assembly at location 142, which is coaxial with the axis 152 of PORT 3. The light beam Z has an orthogonal polarization component O1, indicated by a long thick bar, and a parallel polarization component P1, indicated by a short thick bar. The spurious light beam includes an orthogonal polarization component O2, indicated by a long thin bar, and a parallel polarization component P2, indicated by a short thin bar.

In the walk-off crystal 118, the orthogonal polarization components O1 and O2 are perpendicular to the walk-off direction 160 and therefore propagate through the crystal without deviation. However, the parallel polarization components P1 and P2 are parallel to the walk-off direction of the crystal, so that the components are deviated by the distance of the walk-off distance of the crystal. FIG. 29 shows the polarization components as they enter the positive and negative half-wave plates 122 and 124 of the second split polarization rotator 120 of FIG. 18. The parallel polarization components P1 and P2 are respectively located at the displaced locations 164 and 166 to the right of a line of attachment 162 of the two half-wave plates 122 and 124. The line of attachment 162 is displaced laterally from the optical axis of the optical circulator by a distance of approximately one-half of the walk-off distance of the crystal 118. This causes the orthogonal polarization components to enter the negative half of the split polarization rotator, and the parallel polarization components to enter the positive half of the split polarization rotator. The locations 142, 144, 164 and 166 are symmetrically disposed relative to the line of attachment 162.

Comparing FIGS. 29 and 31, the second split polarization rotator 120 rotates the polarization direction of the orthogonal polarization components O1 and O2 by 90°, but does not affect the polarization direction of the parallel polarization components P1 and P2. Consequently, the polarization components have a common direction as they enter the lens element 96 that preferably includes an array of microlenses. The lens element 96 inverts the positions of the polarization components O1, P1, O2 and P2 about the optical axis of the circulator. Since the orthogonal polarization component O1 lies on the optical axis 104 of the circulator, the lens element leaves the position of O1 unchanged, as shown in FIG. 32. Since the axis 168 of PORT 2 in FIG. 17 coincides with the optical axis 104, the lens element 96 leaves this polarization component aligned with PORT 2. However, the lens element inverts the positions of the orthogonal polarization component O2 and the parallel polarization components P1 and P2 to the displaced locations 170, 172 and 174, respectively.

Since the directions of polarization of all of the four polarization components O1, O2, P1 and P2 are perpendicular to the walk-off direction 146 of the perpendicular walk-off crystal 102, all four components propagate through the crystal without any change in their positions or directions of polarization, as shown by comparing FIG. 32 to FIG. 33.

The polarization components O1, O2, P1 and P2 are equally rotated by the Faraday rotator 112 of the first split polarization rotator 114, as shown in FIG. 34. The orthogonal polarization components O1 and O2 pass through the positive half-wave plate 108, causing further counterclockwise rotation of the polarization direction. On the other hand, the parallel components P1 and P2 have polarization directions that are rotated in the clockwise direction, returning the components to the direction shown in FIG. 35. That is, the first split polarization rotator 114 of FIGS. 18, 33 and 34 causes 90° rotation of the orthogonal components, but leaves the parallel components unchanged.

FIG. 35 shows the polarization components as they enter the walk-off crystal 106 from the first split polarization rotator 114. The orthogonal polarization components O1 and O2 are set in the polarization direction perpendicular to that of the parallel polarization components P1 and P2. The parallel polarization components remain parallel to the walk-off direction 136 of the walk-off crystal 106. Consequently, as shown in FIG. 36, the crystal deflects the parallel polarization components to overlay the associated orthogonal polarization components. The light beam Z is thereby aligned with PORT 2. However, the spurious light beam S is aligned with displaced location 170, so that the spurious light beam is optically isolated from the two TEC fibers at PORT 1 and PORT 2.

Another embodiment is shown in FIGS. 37 and 38. Many of the optical elements of the circulator 176 of FIGS. 37 and 38 are identical to optical elements in the embodiment of FIGS. 17 and 18. Therefore, many of the reference numerals have been duplicated. The illustration of the optical circulator 176 has been expanded to show the first I/O assembly 178 as including the two TEC fibers 180 and 182 that are precisely aligned on a silicon V-groove member 184 of the type described with reference to FIGS. 15 and 16. The second I/O assembly 186 is now illustrated as including the third TEC fiber 188 formed on a silicon V-groove member 190.

The embodiment illustrated in FIGS. 37 and 38 includes the array 192 of microlenses. Referring now to FIGS. 37–39, the microlens array 192 comprises four converging lenses 194, 196, 198 and 200. The array is located adjacent to the rearward face of the perpendicular walk-off crystal 102. Alternatively, the perpendicular walk-off crystal may be spaced from the first I/O assembly 178 and the microlens array may be located adjacent to the forward face of the perpendicular walk-off crystal. Microlenses having a spacing of 250 μm between the optical axes of adjacent lenses are available from Nippon Sheet Glass Co. The I/O assemblies may be easily modified to double the spacing between the optical axes 104 and 202 and to double the walk-off distance of the walk-off crystals 106 and 1 18. With such changes, each of the four microlenses 194, 196, 198 and 200 in the microlens array is centered on the axis of one of the polarization components O1, O2, P1 and P2 as the polarization components propagate to the microlens array. The focal length of the lenses in the array, and the spacing from the ends of the first and second TEC fibers 180 and 182 to the end of the third TEC fiber 188, are selected so that the microlenses form an image of PORT 1 at PORT 3 and form an image of PORT 3 at PORT 2.

The various elements of the optical circulator 176 that are identical to elements of the optical circulator 94 of FIG. 17 operate in the manner described above, and the description will not be repeated. The significant difference is that the lens element, i.e., the microlens array 192, does not invert the polarization components in the manner described with reference to FIGS. 17 and 18. Rather, the polarization components propagate linearly through the lens element in the manner described with reference to FIGS. 3 and 4.

What is claimed is:

1. An optical assembly for coupling ports for transmission of signals comprising:

an array of substantially parallel thermally expanded core (TEC) fibers, each said TEC fiber having an optical core and having a major portion and a first end, each said optical core having a generally constant diameter along said major portion and having an expanded diameter at said first end, said expanded diameter being greater than said generally constant diameter, said first ends being arranged in side-by-side relationship; and an array of optical elements arranged to propagate light in opposed first and second directions, said array of optical elements having a first face perpendicular to said first and second directions, said first ends of said TEC fibers being in light-transfer engagement with said array of optical elements at said first face, at least some of said optical elements being polarization-dependent and said array of optical elements being non-reciprocal with respect to walk-off of light propagating in said first and second directions, said array including polarization walk-off elements positioned to divide a light beam input from one of said TEC fibers into first and second polarization components and further including means for independently focusing said first and second polarization components during propagation through said array.

2. The optical assembly of claim 1 wherein said means for focusing is a plurality of micronlenses.

3. The optical assembly of claim 1 wherein said means for focusing is a mirror having a plurality of concave regions positioned and dimensioned to achieve said independent focusing of said first and second polarization components.

4. The optical assembly of claim 1 wherein said optical elements include a mirror at a side of said array of optical elements opposite to said first face, such that light propagating through said array of optical elements in said first direction is reflected to propagate in said second direction.

5. The optical assembly of claim 4 wherein said optical elements include a lateral walk-off element having a separation distance generally equal to a pitch between TEC fibers in said array of TEC fibers, said lateral walk-off element having a separation direction generally aligned with a plane that intersects said first ends of said TEC fibers in said array, said lateral walk-off element thereby optically coupling a first TEC fiber to an adjacent TEC fiber when light from said first TEC fiber is reflected back to said first face of said array of optical elements.

6. The optical assembly of claim 1 wherein said TEC fibers have a pitch less than 300 μm.

7. The optical assembly of claim 1 wherein said TEC fibers are fixed in a parallel relationship within grooves of a silicon wafer.

8. The optical assembly of claim 7 wherein said grooves are photolithographically formed V-shaped members.

9. An optical assembly for signal transmission comprising:

an array of substantially parallel thermally expanded core (TEC) fibers arranged in side-by-side relationship, including adjacent first and second TEC fibers;

first walk-off means for dividing a light beam input from said first TEC fiber into first and second polarization components;

a mirror positioned relative to said first walk-off means to reflect and focus said first and second polarization components of said light beam such that said first and second polarization components are redirected toward said array, said mirror having an array of surface features for individually focusing said first and second polarization components; and second walk-off means for converging said first and second polarization components at said second TEC fiber such that said light beam is output through said second fiber.

10. The optical assembly of claim 9 wherein said TEC fibers are formed on a silicon wafer.

11. A method for transferring optical signals comprising steps of:

forming an array of side-by-side thermally expanded core (TEC) fibers;

directing a light beam forwardly from a first TEC fiber into a stack of optical elements;

spatially separating said light beam into polarization components within said stack;

displacing each of said polarization components within said stack by a distance generally equal to a distance between said first TEC fiber and a second TEC fiber adjacent to said first TEC fiber;

reflecting said polarization components rearwardly through said stack toward said array of TEC fibers;

independently focusing each of said polarization components during propagation through said stack; and recombining said polarization components into alignment with said second TEC fiber.

12. The method of claim 11 wherein said step of independently focusing said polarization components includes defining a focal length gene rally equal to a distance between a microlens array f or executing said focusing and a mirror for executing said step of reflecting said polarization components.

13. The method of claim 11 wherein said step of focusing said polarization components includes focusing each polarization component using a mirror having an array of surface features arranged to be incident with said polarization components.

14. The method of claim 11 wherein said step of forming said array of TEC fibers includes seating each TEC fiber in a groove of a semiconductor wafer having a plurality of photolithographically formed V-shaped grooves.

* * * * *